M. DRAPIER.
TRANSMISSION MECHANISM.
APPLICATION FILED MAR. 21, 1907.

924,749.

Patented June 15, 1909.

Witnesses

Inventor
Marguerite Drapier
By H. B. Willson & Co.
Attorneys

UNITED STATES PATENT OFFICE.

MARGUERITE DRAPIER, OF PARC ST. MAUR, FRANCE.

TRANSMISSION MECHANISM.

No. 924,749.  Specification of Letters Patent.  Patented June 15, 1909.

Application filed March 21, 1907. Serial No. 363,772.

*To all whom it may concern:*

Be it known that I, MARGUERITE DRAPIER, a citizen of the Republic of France, residing at Parc St. Maur, 22 Avenue Blanche, Seine, France, have invented certain new and useful Improvements in Transmission Mechanism, of which the following is a specification.

The present invention has for its object an apparatus for the transmission of power, adapted for use for all mechanical purposes or machines, but which is more particularly intended for employment on motor road vehicles for transmitting the movement of the driving shaft to a flywheel which is concentric with the same, and which in its turn drives the wheels of the vehicle by any appropriate means. This apparatus transmits the movement from the driving shaft to the flywheel in such a manner that the ratio of the speeds of rotation of these two parts may vary automatically with the variations of resistance, and so that the motor cannot be brought to rest solely under the influence of excessive resistance acting upon the flywheel. All usual change speed gears may therefore be advantageously replaced by the present apparatus, which does not comprise any gear wheels and which is simple and strong in construction.

A constructional form of this apparatus is represented by way of example in the accompanying drawings.

Figure 1:
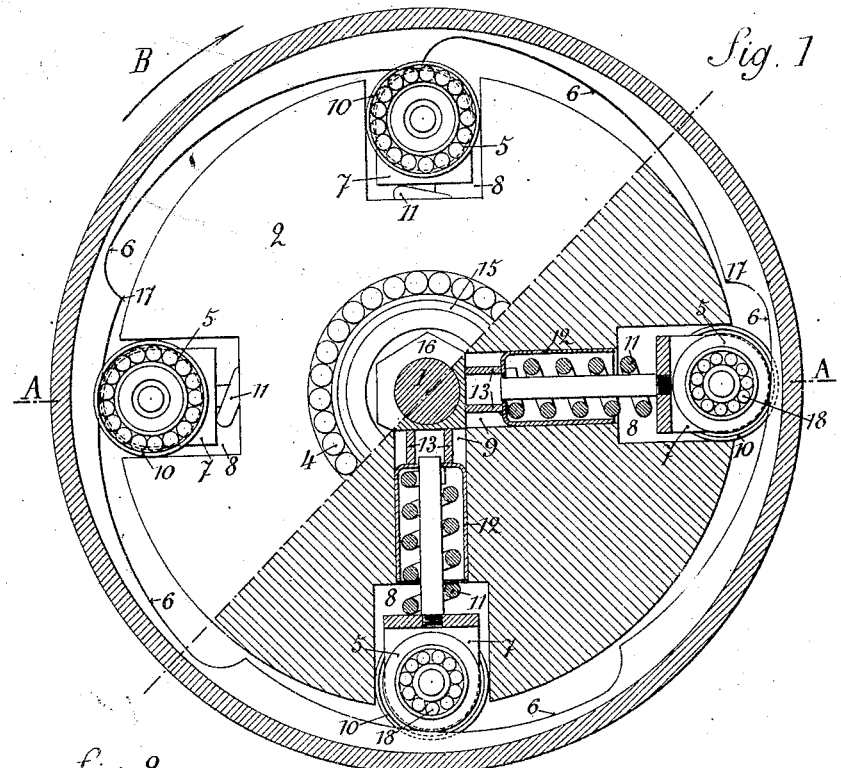
Figure 2:
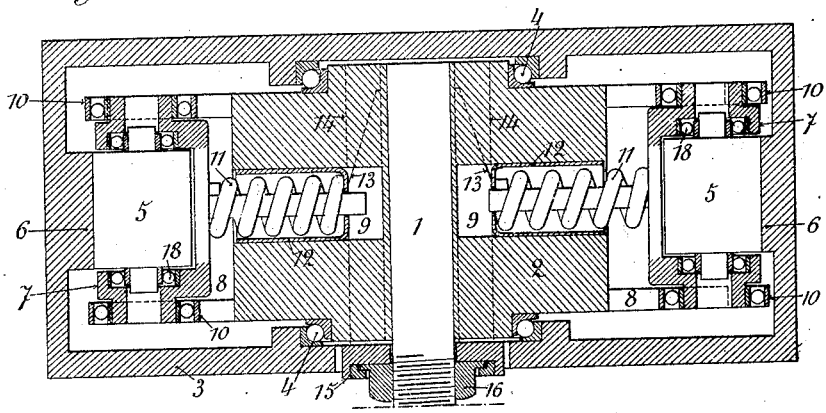

Figure 1 is a section through the apparatus at right angles to the driving shaft. Fig. 2 represents a section on the line A—A of Fig. 1.

To the shaft 1 of the motor there is rigidly fixed a plate 2 and upon this latter a flywheel 3 presenting the form of a circular box is mounted on ball bearings 4 in such a manner as to be capable of rotation. This flywheel 3 is intended for driving the receiving mechanism, the wheels of motor road vehicles for example through any appropriate transmission gear.

The driving of the flywheel 3, representing the resistance, by the plate 2 which represents the power, is obtained by means of rollers 5 mounted in the plate and pressed yieldingly against a path comprising inclined surfaces 6 fixed in the flywheel 3.

Each of the rollers is mounted by means of a ball bearing 18 in a fork 7 guided radially in recesses 8 and 9 formed in the plate 2. The guidance of the fork in the rectangular recess 8 is provided for by means of rollers 10 mounted on balls for the purpose of reducing friction.

Each of the forks is subjected to the action of a powerful spring 11 arranged in a cylindrical box 12 sliding in the recess 9 and resting upon two adjusting wedges 13 movable in grooves 14 parallel with the shaft. All the wedges 13 are fixed to a ring 15 sliding freely on the shaft 1, and to which a nut 16 screwed upon the latter is connected, in such a manner that by acting upon this nut the tension of all the springs 11 is adjusted simultaneously.

When the driving shaft 1 and the plate 2 rotate at a given speed in the direction indicated by the arrow B, the rollers 5 pressed against the inclined surfaces 6 exert upon these latter efforts, the components of which, directed tangentially to the circle of rotation, exert an action equivalent to that of the motor couple of the shaft 1; when the resistant couple is less than the motor couple, or equal to it, the flywheel 3 is driven, and rotates at a speed equal to that of the driving shaft.

The inclination, the height of the inclined surfaces 6, and the strength of the springs 11, are determined in such a manner that the rollers 5 do not reach the summit 17 of the inclined surfaces except under the influence of the maximum couple that the motor is capable of producing normally. It follows that for each value of the resistance less than or equal to the motor couple, the rollers 5 will occupy predetermined positions of equilibrium upon the inclined surfaces, and will approach the summits 17 more closely according as the resistance is greater, thereby compressing the springs 11 to an increasing extent.

If the resistant couple should exceed the motor couple, the rollers 5 will pass over the summits 17 and run upon the inclined surfaces 6, continuing to exert upon these latter driving efforts which are reproduced every time a roller acts upon a fresh inclined surface and act in the manner of successive impulsions; the flywheel 3 then rotates less rapidly than the shaft 1, its speed decreasing in proportion to the increase of the resistance, while it receives a proportionately increased number of impulsions from the rollers 5. The transmission ratio therefore varies automatically in proportion to the resistance in such a manner that perfect equality is always maintained between the motive power represented by the increasingly numerous impulsions exerted upon the inclined surfaces 6 and the increasing power absorbed by the mechanism connected to the flywheel 3.

In order to render the driving couple as constant as possible, it is advantageous to arrange the rollers 5 uniformly, with a number of first inclined surfaces between them, say four and five (see Fig. 1).

For each degree of power of the motor, the speed of the vehicle or of the engine or the like will adjust itself in proportion to the resistance to be overcome. If it is desired to increase or decrease the speed of the vehicle, for example, at a given moment, it is only necessary to increase or decrease the power of the motor at such moment by the well known means.

The inclined surfaces 6 are preferably made of leather, or other similar material, in order to deaden the noise of the rollers 5 when they pass over the summits 17.

Without departing from the invention, it is of course possible to vary the unessential constructional details of the transmission apparatus which is here represented by way of example. For exmaple, instead of the springs 11, any other equivalent elastic members, such as compressed air pistons or the like may be employed. The number and the length of the roller-races 6 may also be varied, as, for instance, a single race may be extended on the whole of the circumference of the flywheel 3, and any number of rollers may be made to act with yielding pressure on the said race. Two or more similar races or series of races may be arranged side by side in the flywheel, and combined with an equal number of series of yielding pressure rollers. On the other hand, instead of locating the races exteriorly with respect to the rollers, the latter may be arranged outside the former, in which case the races are formed on the outer periphery of the flywheel, and the rollers, arranged around the races, are mounted on spring pressed pistons slidable radially in a driving ring concentric to the flywheel and located either at the outside or inside of the latter. The races may also be arranged laterally on one or both sides of a flywheel or on the inner sides of two parallel flywheels, while the rollers will be carried by transversal pistons slidable parallelly to the axis of rotation of a driving plate or plates parallel to the flywheel. The latter arrangement may be of advantage as to the reduction of the diameter of the apparatus and the facility with which the springs may be adjusted.

Claim—

In a variable speed transmission apparatus, the combination of a rotary plate, a fly wheel having the axis thereof coincident with that of the plate and provided with a raceway having one or more protuberances, one side of which is slightly inclined and the other side of which is steeply inclined, pistons radially guided on the plate and yieldingly pressed toward said raceway, and cylindrical rollers mounted on said pistons and running on the raceway which has its generating lines parallel to the axis of the fly wheel.

In testimony that I claim the foregoing as my invention, I have signed my name in presence of two subscribing witnesses.

MARGUERITE DRAPIER.

Witnesses:
 JULES DRAPIER,
 MAURICE ROUX.